_United States Patent Office_ 3,700,494
Patented Oct. 24, 1972

3,700,494
BRIGHT-FINISH WELDING WIRE
Samuel C. Avallone, Westlake, Ohio, assignor to
United States Steel Corporation
No Drawing. Original application Jan. 29, 1970, Ser. No. 6,929, now Patent No. 3,563,074, dated Jan. 16, 1971. Divided and this application Sept. 16, 1970, Ser. No. 72,840
Int. Cl. B23k 35/22; C23f 7/26
U.S. Cl. 117—202                                3 Claims

ABSTRACT OF THE DISCLOSURE

Article of the invention is a bright-finish weld-wire for electric welding purposes having a low hydrogen level and an extended shelf life.

---

This application (Patent Office classification 29, subclass 193), which is a division of my copending application, Ser. No. 6,929, filed Jan. 29, 1970, Pat. No. 3,563,074, relates generally to welding wire and, more particularly, to an improved bright-finish welding wire especially suitable for electric welding and which will maintain its bright finish for an extended period of time.

Essential to the optimum utilization of newly developed low-alloy constructional steels of high yield strength is an effective and compatible welding system. In order to weld such low-alloy steels, it is necessary that a high-grade, flawless filler-medium wire be used. Such wire must have a low hydrogen level and the ability to undergo storage for relatively long periods without losing its high quality. Research studies have established that these two factors (low hydrogen level and prolonged storage life) can be controlled by using a unique wire processing method which is effective to develop and maintain a bright, smooth finish on the welding wire and a minimal residual surface lubricant film thereon. It is necessary to provide a practically lubricant-free finish on the wire to prevent hydrogen pick-up which causes weld-metal cracking.

It is, accordingly, the primary object of my invention to provide a smooth, cold-drawn, bright-finish welding wire, the surface of which has a minimum amount of wire-drawing lubricant remaining thereon but a sufficient film of an inhibiting agent to provide adequate corrosion resistance and, at the same time, be compatible with electric welding methods which are currently being used.

The above and other objects will become apparent from the following description of my invention.

The method used to produce the wire of the present invention relates specifically to the finishing phase of wire manufacture and finds advantageous utilization in the manufacture of substantially all high-strength filler metals for use in welding constructional alloy steels. One example of a plain carbon steel weld-wire composition suitable for this purpose is 0.11 C, 1.00 Mn, 0.27 Si, 0.024 S, 0.017 P, and the balance iron. A typical steel alloy weld-wire composition for this purpose is 0.08 C, 5.0 Ni, 0.50 Cr, 0.50 Mo, and the balance iron. Weld-wire of metal alloys other than steel can be advantageously treated by the method to be described hereinafter whereafter it is desirable to maintain the hydrogen content of the wire at the lowest possible level. Examples of such other metal alloys are high nickel chrome alloys such as Nichrome having a typical composition of 80% Ni and 20% Cr. Another high nickel chrome alloy which can be advantageously treated by the method to be described to produce low hydrogen content weld-wire in accordance with the invention is Inconel having a typical composition of 35% Ni, 18% Cr and 47% Fe.

In carrying out the method to produce the wire of the invention, the wire which has been previously cold-drawn to process size is cleaned by passing it through an acid electrolyte consisting of 15 to 25% sulfuric acid solution at 100 to 180° F. at a current density of 50 amperes per square inch and in close proximity to immersed lead electrodes. The polarity of the wire is alternated as it passes through the electrolyte. The final wire polarity is anodic to minimize surface hydrogen contamination.

After cleaning, the wire is reduced by a light draft (approximately 5 to 25% reduction) through a diamond wire-drawing die having an included entrance angle of approximately 25 to 40°. It has been found that optimum results are uniformly obtained reducing the wire approximately 15%. The use of a large entrance angle minimizes the amount of lubricant carried through the die with the wire and, therefore, minimizes the amount of residual lubricant in the wire after drawing. The diamond die, because of its high-hardness and the low-level of friction that it develops in drawing, requires a minimum of lubrication with the result that a clean, smooth finish is obtained after drawing. If desired, a conventional tungsten-carbide die could be used in the drawing operation. However, closer inspection of the finished product would have to be maintained if a tungsten-carbide die was used in place of the diamond die since the former is lower in hardness and would require more frequent replacement due to wear.

An aqueous wire-drawing lubricant is used during the wire-drawing operation. This aqueous wire-drawing lubricant consists of an aqueous solution of a water-soluble soap and a water-soluble inorganic rust inhibitor. Sodium stearate, sodium oleate, sodium palmitate, potassium palmitate, sodium laurate, and potassium laurate have been found to be suitable water-soluble soaps for this purpose. Sodium chromate, potassium chromate, sodium dichromate, and potassium dichromate have been found to be effective for use as water-soluble inorganic rust inhibitors producing the wire of the invention.

An example of a suitable aqueous wire-drawing lubricant composition is as follows:

0.75% sodium stearate by weight;
0.75% sodium chromate by weight;
98.50% water by weight.

Increasing the concentration of the water-soluble soap in the wire-drawing lubricant solution has not been found to be detrimental to the efficacy of this method of producing the wire of the invention nor has it been found to improve the method to any appreciable extent. Acceptable results have been obtained using a solution having as low as 0.30% (by weight) of soap.

Other water-soluble soaps besides those mentioned above may be used so long as they provide satisfactory lubricity.

The percentage of water-soluble inorganic rust inhibitor may range from 0.30% to 1.50%. However, concentrations in excess of 0.75% are not economically feasible since they have not been found to appreciably enhance the corrosion-resistant quality of the wire.

The rust inhibitor added to the wire-drawing lubricant must be an inorganic material so that it does not become a source of hydrogen at the fusion point (at welding heat) in the welding operation. The rust inhibitor effectively prolongs the shelf life of the wire of the invention.

The use of high concentrated aqueous wire-drawing lubricant solutions should be avoided since the use of excess quantities of lubricant add to the surface contamination of the wire being drawn. The wire-drawing lubricant must be liquid so that it will flow out of the die and not adhere to the wire.

By practicing the method just described, I have produced the cold-drawn, bright-finish weld-wire of my invention having hydrogen contents consistently maintained below six parts per million, by weight, and above 0.50 part per million, by weight.

If it is desired to produce weld-wire having the ultimate minimum hydrogen content, the wire-drawing step of the method may be carried out with two or more diamond dies arranged in tandem. The use of more than one die permits lighter drafts to bring about the total desired reduction of approximately 5 to 25%. For example, in producing a weld-wire in accordance with the invention having a finished diameter size of .062 inch, a starting wire having a diameter of .067 inch may be used. This starting wire may be reduced to .064 inch diameter through one die and to .062 inch finished diameter size through a second die.

Although I have described but one embodiment of my invention, it will be apparent that other adaptations and modifications may be made without departing from the scope of the following claims.

I claim:

1. A weld-wire for use in electric welding comprising a length of steel welding wire having a smooth bright finish, a corrosion-resistant surface film on said wire, said wire and said surface film together having a total hydrogen content below six parts per million by weight.

2. A weld-wire as defined by claim 1 in which said film is comprised of an inorganic corrosion inhibitor which is one of the group consisting of sodium chromate, potassium chromate, sodium dichromate and potassium dichromate.

3. A weld-wire as defined by claim 2 in which the surface of said wire is substantially free of wire-drawing lubricant.

References Cited
UNITED STATES PATENTS

| | | | |
|---|---|---|---|
| 2,943,180 | 6/1960 | Kelker | 219—146 X |
| 3,554,791 | 1/1971 | Johnson et al. | 219—146 X |
| 2,788,292 | 4/1957 | Giesker et al. | 148—6.2 X |
| 3,348,979 | 10/1967 | Murphy et al. | 117—202 X |

RALPH S. KENDALL, Primary Examiner

C. WESTON, Assistant Examiner

U.S. Cl. X.R.

148—6.2; 219—146